US009827657B1

(12) United States Patent
Nelson

(10) Patent No.: US 9,827,657 B1
(45) Date of Patent: Nov. 28, 2017

(54) TOOL AND METHOD FOR GARBAGE DISPOSAL INSTALLATION

(71) Applicant: Brian L. Nelson, Mccall, ID (US)

(72) Inventor: Brian L. Nelson, Mccall, ID (US)

( * ) Notice: Subject to any disclaimer, the term of this patent is extended or adjusted under 35 U.S.C. 154(b) by 0 days.

(21) Appl. No.: 15/630,893

(22) Filed: Jun. 22, 2017

(51) Int. Cl.
| | |
|---|---|
| *B23P 11/02* | (2006.01) |
| *B25B 27/16* | (2006.01) |
| *B25B 27/20* | (2006.01) |
| *E03C 1/266* | (2006.01) |
| *B21D 39/00* | (2006.01) |
| *B23P 19/00* | (2006.01) |

(52) U.S. Cl.
CPC ............. *B25B 27/16* (2013.01); *B25B 27/20* (2013.01); *E03C 1/2665* (2013.01); *B21D 39/00* (2013.01); *B23P 19/001* (2013.01)

(58) Field of Classification Search
CPC ......... B23P 11/00; B23P 11/005; B23P 19/00; B23P 19/10; B23Q 3/00; B23Q 3/154
See application file for complete search history.

(56) References Cited

U.S. PATENT DOCUMENTS

| | | | | |
|---|---|---|---|---|
| 5,285,568 A * | 2/1994 | Johann | ..................... | B23P 15/06 29/229 |
| 5,584,110 A * | 12/1996 | Mordoch | ............ | B25B 27/0028 29/225 |
| 6,360,419 B1 * | 3/2002 | Newcomer | ......... | B25B 27/0028 29/225 |
| 8,826,505 B2 * | 9/2014 | Dines | ..................... | E03C 1/266 29/244 |
| 2003/0192162 A1 * | 10/2003 | Ramirez | ................. | B25B 27/20 29/450 |
| 2009/0199382 A1 * | 8/2009 | Heaton | ................... | B25B 27/20 29/270 |

* cited by examiner

*Primary Examiner* — Lee D Wilson
(74) *Attorney, Agent, or Firm* — Pedersen and Company, PLLC; Ken J. Pedersen; Barbara S. Pedersen

(57) ABSTRACT

A tool aligns a snap-ring with a sink-flange tailpiece of a garbage disposal, and is used to slide the ring up along the tailpiece outer surface to a groove. The tool expands the snap-ring, prior to installation on the tailpiece, by an expansion mechanism, to a diameter that is slightly larger than the outer diameter of the tailpiece. The tool receives a stack of conventional disposal components on the tool top end, so the user with one hand can raise the tool and the stack to the tailpiece, and the fingers and thumb of the one hand can push the expanded snap-ring upward to reach and snap into the groove. The expansion mechanism may be a tapered tool bottom end, an expander tab, and/or an adaptation wherein the tool is reduced in diameter to fit inside a relaxed snap-ring and then increased in diameter to expand the snap-ring.

20 Claims, 16 Drawing Sheets

TOOL AND METHOD FOR GARBAGE DISPOSAL INSTALLATION

BACKGROUND OF THE INVENTION

Field of the Invention

The invention relates to tools and methods for assisting a plumber or other user to install a conventional garbage disposal under a sink. More specifically, the tool and methods improve ease, speed, and comfort of the step of installing the snap-ring onto the sink flange. More specifically, the tool and methods are simplified and streamlined, compared to the prior art, for example, because preferred embodiments comprise a single-piece tool that is usable in one hand and that does not need to be fixed or secured to any part of the garbage disposal. Therefore, the tool and method will be beneficial for both repeated and frequent use, for example by a plumber installing many disposals, or for occasional or even on-time use, for example by a homeowner or other "do-it-yourselfer".

Related Art

In-sink garbage disposals are popular and ubiquitous in homes, offices and businesses. INSINKERATOR™ offers many such disposals, and many of the components and installation methods of the INSINKERATOR™ disposals have become standard or at least very common in the industry. Most disposals have a sink flange system with a groove into which a snap-ring fits, to hold and orient various components in position under the sink, for subsequent connection of the grinder unit is to these various components and to the sink flange. Installation of the disposal, and particularly the snap-ring, has long been experienced, and known, to be a difficult, uncomfortable, and/or clumsy process that causes discomfort and inefficiency to a plumber or to a home-owner or a do-it-yourselfer.

Conventional in-sink garbage disposal structure and installation, including the problem of snap-ring installation, are known in the art and are discussed in the patent literature. Several tools have been disclosed in the patent literature to attempt to improve the snap-ring installation process. Murdoch U.S. Pat. No. 5,584,110 disclosed a multiple-tool system wherein one tool is fixed to the tailpiece of the sink flange, and then a second, separate tool pushes on the snap-ring. Newcomer U.S. Pat. No. 6,360,419 also discloses a multiple-tool system wherein a snap-ring is held in a groove on one tool, and a second, separate tool pushes on the snap ring.

There is still a need for an improved, economical, easy to use tool for snap-ring manipulation and installation in a garbage disposal assembly. The present invention meets this need.

SUMMARY OF THE INVENTION

The invention comprises a garbage disposal installation tool, and/or methods of using the tool, for aligning a snap-ring with a sink-flange, and sliding the snap-ring up along the sink-flange outer surface and into the sink-flange groove. The tool is adapted to expand the snap-ring, prior to installation on the tailpiece of a sink flange, to a diameter that is nearly the same as, but preferably slightly larger than, the outer diameter of the tailpiece of the sink flange and to carry the expanded snap-ring on the tool's outer cylindrical surface. The tool is adapted to receive a stack of conventional disposal components on the tool top end, so the user with one hand can raise the tool and the stack with one hand to detachably mate the top end of the tool with the bottom end of the sink flange tailpiece. The tool is simply pressed up against the tailpiece bottom end, by one hand of the user, and there is no tool portion fixed to or fastened to the tailpiece or any portion of the sink flange. The fingers and thumb of said one hand can then push the expanded snap-ring, and consequently the stack of components, upward along the outer cylindrical side surface of the tailpiece, until the snap-ring reaches, and snaps into, the groove of the tailpiece. Thereafter, the stack of conventional disposal components remains around the sink-flange, supported by the snap-ring retained in the groove, and the user's one hand can lower the tool in order to proceed with subsequent disposal installation steps.

In preferred embodiments, the tool comprises a cylindrical main portion with a top end adapted to mate with the bottom end of the sink flange tailpiece, and a snap-ring expansion mechanism/adaptation. The snap-ring expansion mechanism/adaptation is preferably selected from one or more of the following: a tapered (or beveled or chamfered) bottom end of the tool, an expander tab that protrudes radially outward from the main portion of the tool, and an adaptation wherein the tool may be reduced in diameter to fit inside a relaxed snap-ring and then increased in diameter to expand the snap-ring to the desired diameter for sliding up onto the tailpiece. Each snap-ring expansion mechanism/adaptation allows easy and controlled expansion and temporary retention of the snap-ring on the tool, prior to moving the tool and snap-ring to the sink-flange.

These and other objects and features of certain embodiments will be further understood in view the Detailed Description and the Figures. For example, the preferred mechanisms/adaptations may be provided by the tool comprising, consisting essentially of, or consisting of, a single cylindrical or generally cylindrical piece having one, two, or all of: a tapered bottom end, an expander tab, and/or a slit all the way through the single cylindrical piece to allow said tool-diameter reduction and increase.

DESCRIPTION OF THE PREFERRED EMBODIMENTS

Figure 1:
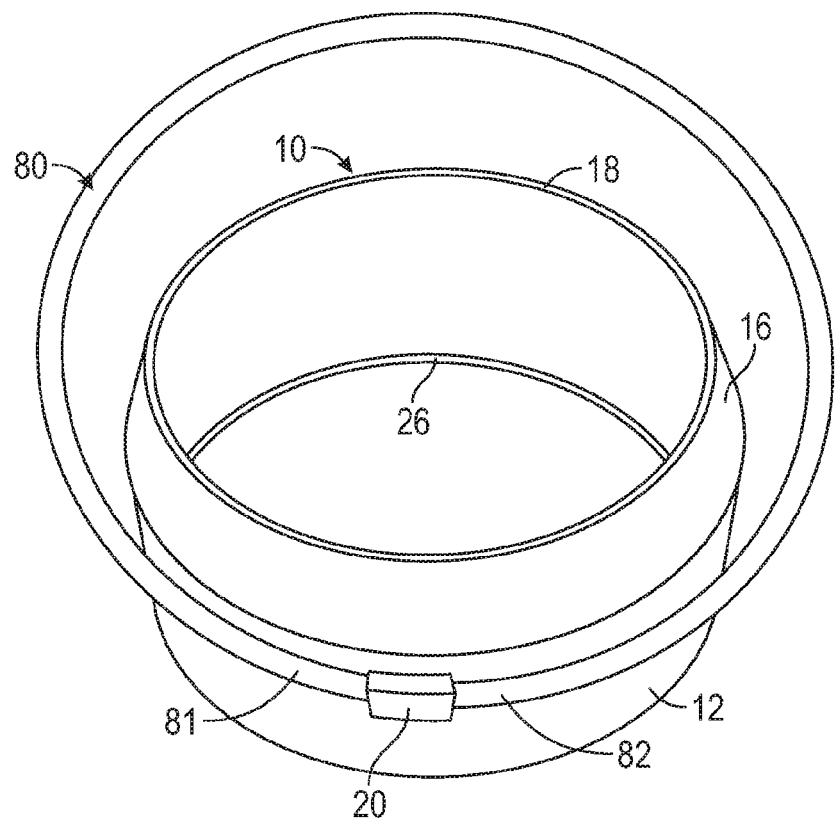
FIG. 1 is a perspective view of one embodiment of the invented tool, in combination with a snap-ring that is expanded but not yet pushed around the main portion of the tool, wherein the tool is in the ring-mounting orientation with the tool bottom end pointing generally upward.

Referring to the Figures, there are shown several, but not the only, embodiments of the invented tool and method.

FIGS. 1-12 illustrate one embodiment of a tool 10 and its use with a conventional snap-ring 80 and conventional garbage disposal components. The tool 10 may be described as a hollow and generally cylindrical, and comprises a hollow cylindrical main portion 12 having a top end 14 with an outermost wall/edge 24 adjacent to a contoured (curved or recessed, or "cupped") top end surface 26. The tool 10 further comprises a tapered (or slanted, beveled, or chamfered) bottom end 16 with a bottommost edge 18. The taper of the bottom end 16 is directed inward from the main portion 12 toward the bottommost edge 18 of the tool 10, to reduce the outer diameter of the tool consistently and smoothly all the way from the main portion to the bottommost edge.

The tool is typically employed in two general orientations. The first orientation is a ring-mounting orientation wherein the user mounts the snap-ring 80 onto the tool (FIGS. 1-4) so that: 1) the ring is expanded to have an inner diameter generally the same as (preferably slightly larger than) the diameter as the outer cylindrical surface of the tool main portion 12, which is slightly larger than the outer diameter of the sink flange tailpiece 101, and 2) the ring is held on the tool in a controlled and stable manner for easy manipulation of the ring 80 during subsequent steps. The second orientation is an in-use orientation, as in FIGS. 5-12, and 15-18, that is important for transferring the snap-ring 80 from the tool onto a conventional sink flange tailpiece 101, whereupon the ring 80 retains conventional garbage disposal components in position prior to connection of a conventional disposal grinder unit to said components as known in the art. An exemplary sink S, and exemplary conventional components of an in-sink garbage disposal, are illustrated in FIGS. 7-10.

The ring-mounting orientation of tool 10 is illustrated in FIGS. 1-4, wherein the top end 14 is pointed generally toward the top of the page. The in-use orientation of tool 10 is illustrated in FIGS. 5-12, and 15-18, wherein the top end 14 is pointed upward toward the top of the page.

To install the snap-ring 80 on the tool 10, the snap-ring 80 is pulled apart by the user to spread apart the two ends 81, 82 of the snap-ring 80, and place the ends 81, 82 on opposite ends of the expander tab 20. The resilient bias of the snap-ring 80, which urges the ring 80 to close/reduce-in-diameter, forces the ends 81, 82 against the expander tab 20 and tends to hold the snap-ring 80 in the position shown in FIG. 1. The expander tab ends 21, 22 (FIGS. 2, 3 5, and 11) are parallel to the central longitudinal axis LA of the tool (FIG. 11), and are preferably planar and flat, so that the ring ends 81, 82 grip the expander tab 20 when desired (FIGS. 1-4) but move away from the ends 21, 22 when the ring is expanded by being forced around the main portion 12 (FIGS. 5 and 6) and/or when the ring is pushed away from the tab 20 toward the top end 14 of the tool.

It is noteworthy that said resilient bias of the snap-ring 80 against tab ends 21, 22 is one example of a radial protrusion, specifically tab 20 in the case of tool 10, being adapted and used to temporarily retain, control, and/or stabilize at least one end of the snap-ring 80. Because of this temporary retention, control and/or stabilization, the ring 80 is unlikely to "fly", "snap" or otherwise move off the tool during manipulation of the ring 80, making easier said manipulation and proper placement of the ring on the tool. In the case of FIGS. 1-4, two ends of the snap-ring 80 are temporarily retained, control, and/or stabilized on the tab 20, but the tab 20 may be used in other ways, for example, to interact with only one of the ring ends, as discussed later in this document regarding FIG. 18.

Figure 2:
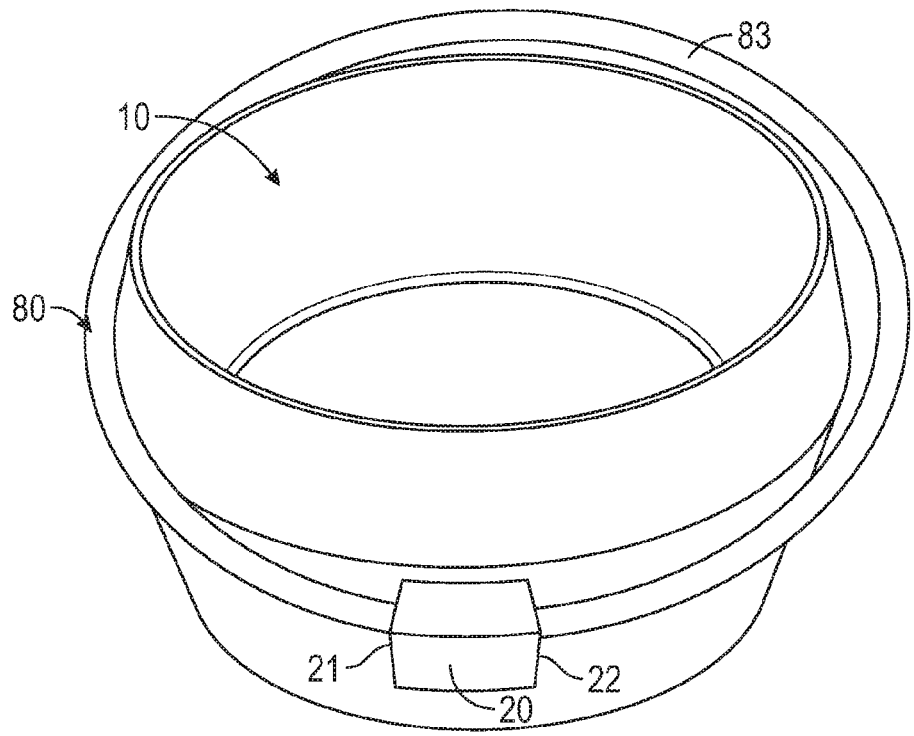
FIG. 2 is a perspective view of the tool of FIG. 1, still in the ring-mounting orientation, wherein the snap-ring has been pivoted toward the tool prior to being pushed around the tool.
Figure 3:
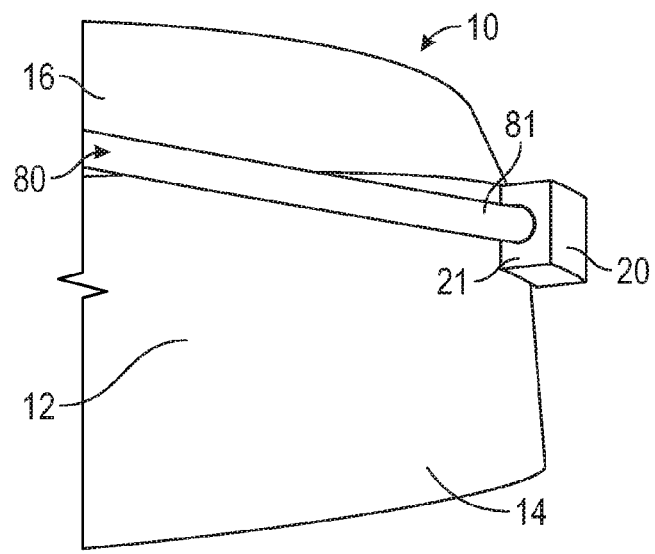
FIG. 3 is a partial, left side view of the tool and snap-ring of FIG. 2, still in the ring-mounting orientation.
Figure 4:
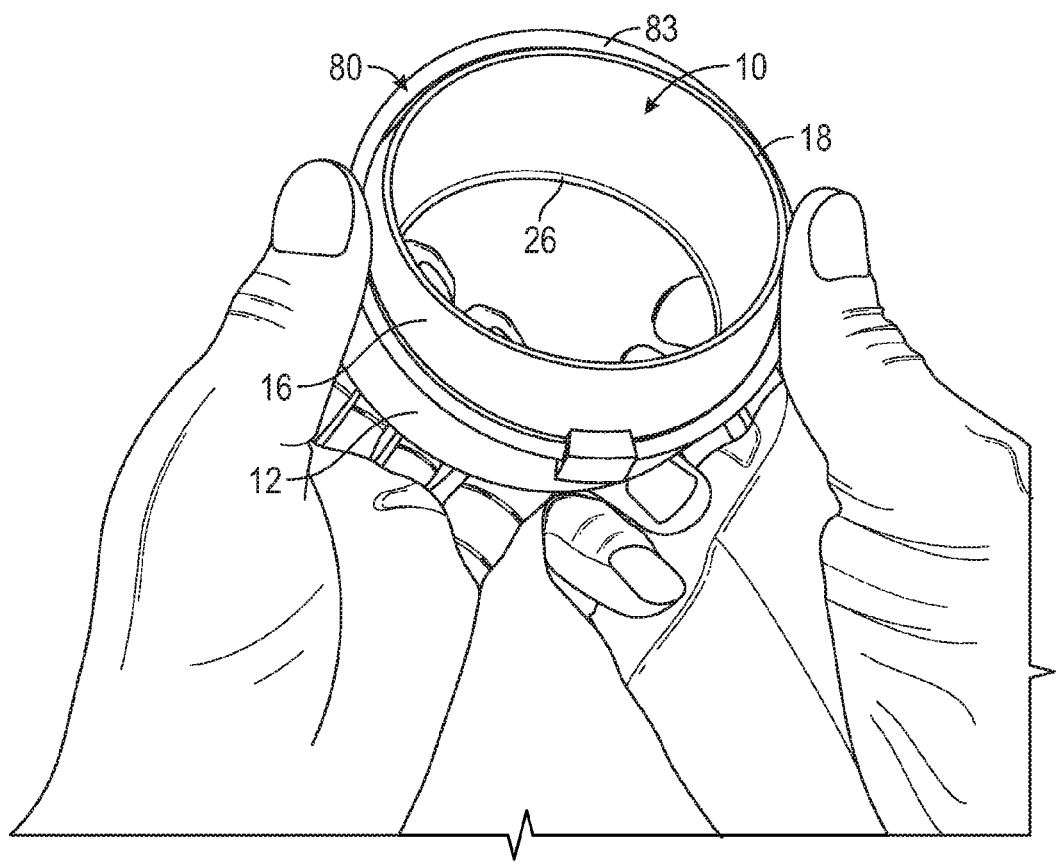
FIG. 4 is a perspective view of the tool and snap-ring of FIGS. 1-3, still in the ring-mounting orientation with the tapered bottom end of the tool pointing generally upward, wherein the user is forcing the snap-ring, with his/her thumbs, down along the tapered bottom end surface and onto the outer cylindrical surface of the main portion of the tool.

The user then pivots the snap-ring 80 relative to the tool 10, to move the back portion 83 of the ring 80 that is opposite the ends 81, 82 toward the tool, into the position shown in FIGS. 2 and 3. Moving the ring 80 from the position of FIG. 1 to the position of FIGS. 2 and 3 typically does not require much force, as the ends 81, 82 rotate on the ends of the expander tab 20 as the ring 80 pivots, and the ring 80 slides easily around the tapered bottom end 16 without further expanding. However, more force is required to pivot the ring 80 fully onto the main portion 12, which is larger in outer diameter than the tapered end 16, and especially larger in diameter than the tapered end at its bottommost edge 18. FIG. 4 illustrates how a user may grasp the tool in two hands, and use the thumbs to push the ring 80 further onto the tool 10, pivoting the ring 80 (especially portion 83) along the tapered outer surface of end 16 and then entirely onto the main portion 12. Forcing the ring 80 from the tapered bottom end 16 to the main portion 12 results in further expansion of the ring 80, which results in the ring ends 81, 82 moving circumferentially away from the expander tab 20.

After the action illustrated in FIG. 4, the ring 80 is coaxial with the main portion and the tool, and extends around most of the outer circumference of the main portion 12 with the ring ends 81, 82 spaced apart slightly more than the circumferential length of the expander tab 20. During this procedure, the user typically pushes the snap-ring 80 further toward the top end 14 of the tool 10, away from the expander tab, to the position illustrated in FIGS. 5 and 6. Note that in FIGS. 5 and 6, the tool has been rotated/flipped 180 degrees, from the ring-mounting position to the top-end-up position of the in-use orientation.

Figure 7:
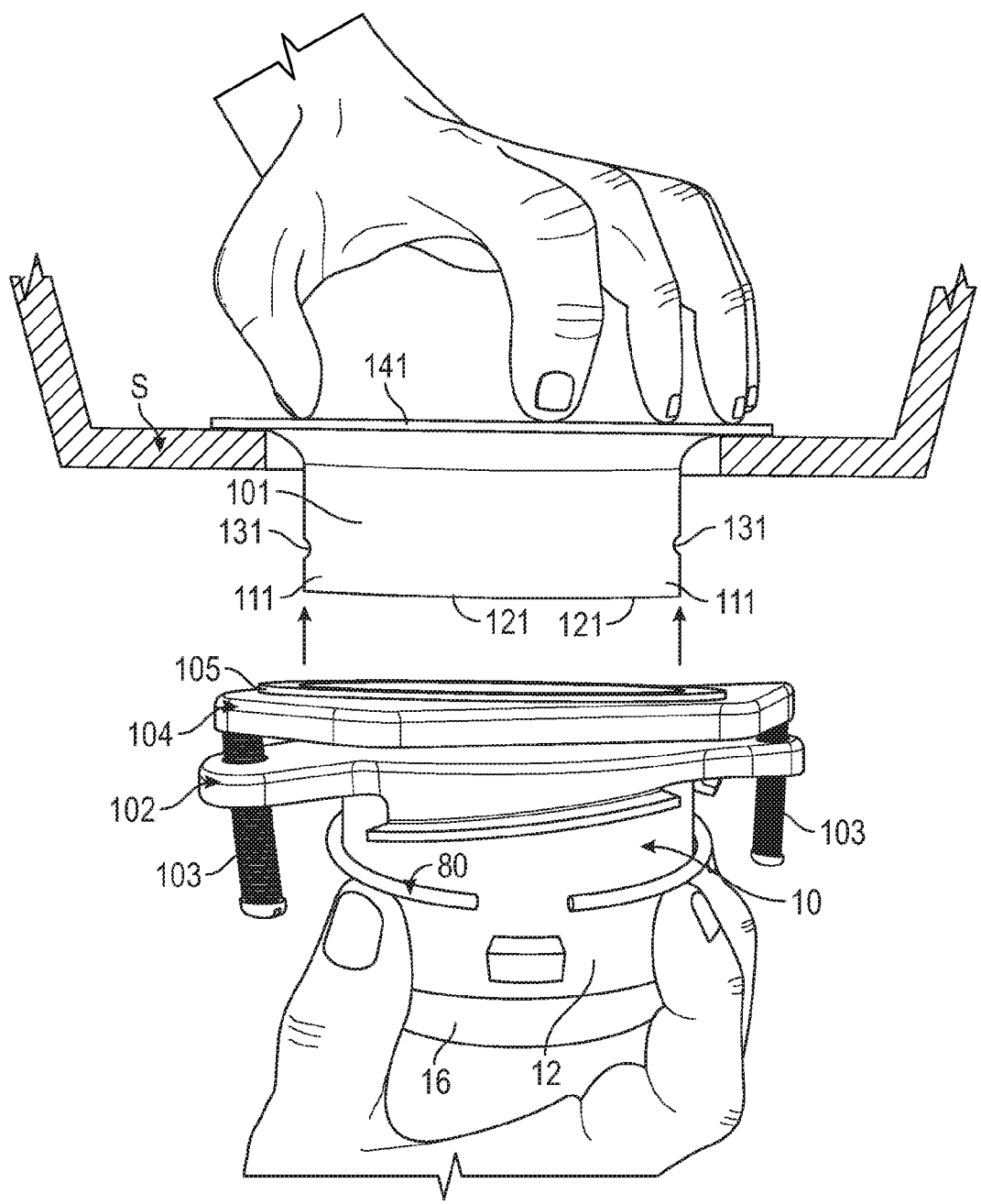
FIG. 7 is a side view of a conventional fiber gasket, backup flange, and mounting ring with screws, all stacked on/around the top end of the tool on which the snap-ring is installed as in FIGS. 1-6, so the user can raise, in one hand, the tool with snap-ring and the stacked components toward the tailpiece of a conventional sink flange in a conventional sink.

For installation of the snap-ring 80 onto conventional disposal components, the user stacks multiple conventional disposal components on top of the tool 10, as shown in FIG. 7. The stack comprises (from bottom to top) a conventional mounting ring 102 with screws 103, a conventional backup flange 104, and a conventional gasket 105 on top of the top end 14 of the tool 10, with all of these conventional components are coaxial with the tool 10. The inner edge of the opening in the mounting ring 102 rests on the outermost wall/edge 24 of the top end 14 of the tool, so that the mounting ring 102, and the conventional components on top of the mounting ring 102 are supported in the stack on top of the tool 10. The inner edge of the mounting ring 102 does not extend any significant distance over, or interfere with, the contoured top end surface 26 (see FIGS. 15 and 15A).

It is noteworthy that the tool 10 has a main portion outer cylindrical surface that is slightly larger in diameter compared to the outer cylindrical surface of the tailpiece 101 that depends down through the drain hole of the sink. For example, the main portion 12 outer cylindrical surface is preferably about ⅛ inch-¼ inch (preferably ⅛ inch) larger in diameter than the tailpiece outer cylindrical surface. This ⅛ inch-¼ inch (preferably ⅛ inch) enlargement compared to the tailpiece outer cylindrical surface forms the outermost wall/edge 24 that extend vertically up along-side the bottom end 111 of the tailpiece (FIG. 15A). Thus, the tool 10 will expand the ring to an inner ring diameter to be slightly (⅛-¼ inch, and preferably ⅛ inch) larger than the tailpiece diameter. The cradling/mating of the contoured top end surface 26 with the tailpiece bottom end 111, and the outermost wall/edge 24 extension up along-side end bottom end 111 allows effective and stable centering of the tool against the bottom end 111 of the tailpiece. See FIG. 15A. Even though slightly enlarged relative to the outer diameter of the tailpiece, the main portion 12 outer diameter still allows smooth and easy transfer of the snap-ring 80 from the tool outer cylindrical surface to the tailpiece outer cylindrical surface.

The outer diameter of main portion 12, and the resulting outermost wall/edge 24, also serve to support the stack of conventional disposal components, discussed above regarding FIG. 7. Each of the conventional mounting ring 102, backup flange 104, and gasket 105 has an opening inner diameter that is slightly larger than the diameter of the outer cylindrical surface of the tailpiece 101, so that the conventional components 102, 104, 105 can slide up around the tailpiece 101, in effect, because the components' inner openings are slightly larger than the tailpiece. The diameter of the outer cylindrical surface of the main portion 12 is slightly larger than said inner openings of the components 102, 104, 105, by about ⅛ inch (⅛-¼ inch, and preferably ⅛ inch) larger than the tailpiece diameter, so that the conventional components all stack on top of the tool 10, supported by the outermost wall/edge 24 of the top end 14 of the tool. Thus, the components rest/balance on the tool, and the user can use one hand to raise the tool with ring 80, and the stacked components 102 with screws 103, 104, 105, as a single unit up toward the sink, but the tool outer diameter is still small enough to allow easy and smooth movement of the user's fingers and the ring 80 from the tool to the tailpiece.

Figure 8:
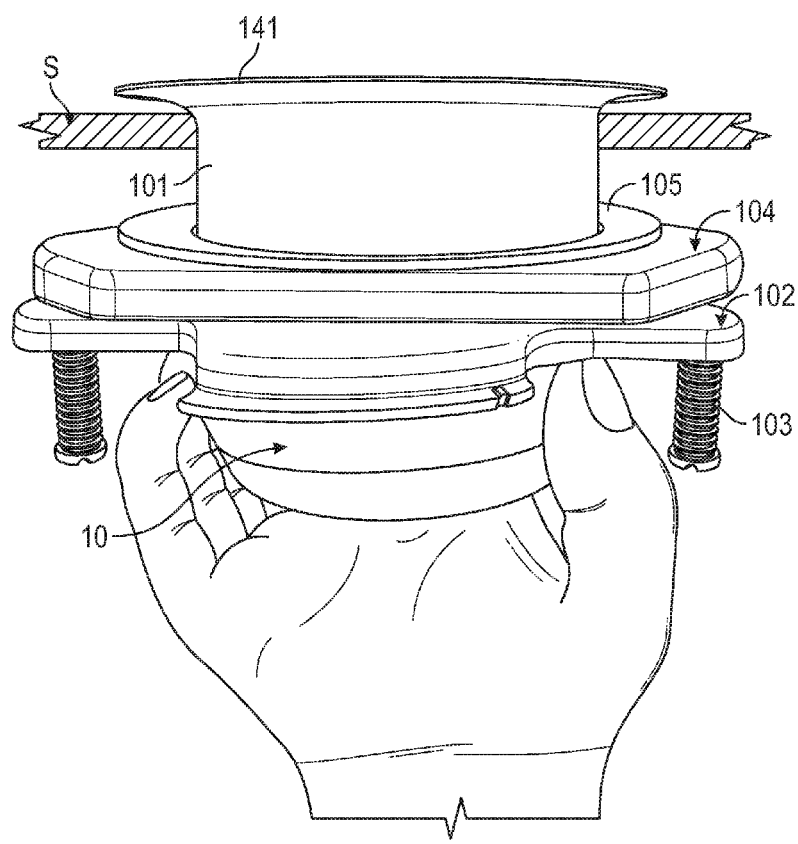
FIG. 8 is a side view of the user's one hand pushing the tool top end against the bottom end of the tailpiece and pushing the snap-ring (hidden from view) up higher on the tool outer cylindrical surface, and with the stack of components still resting on the top edge of the tool.
Figure 8A:
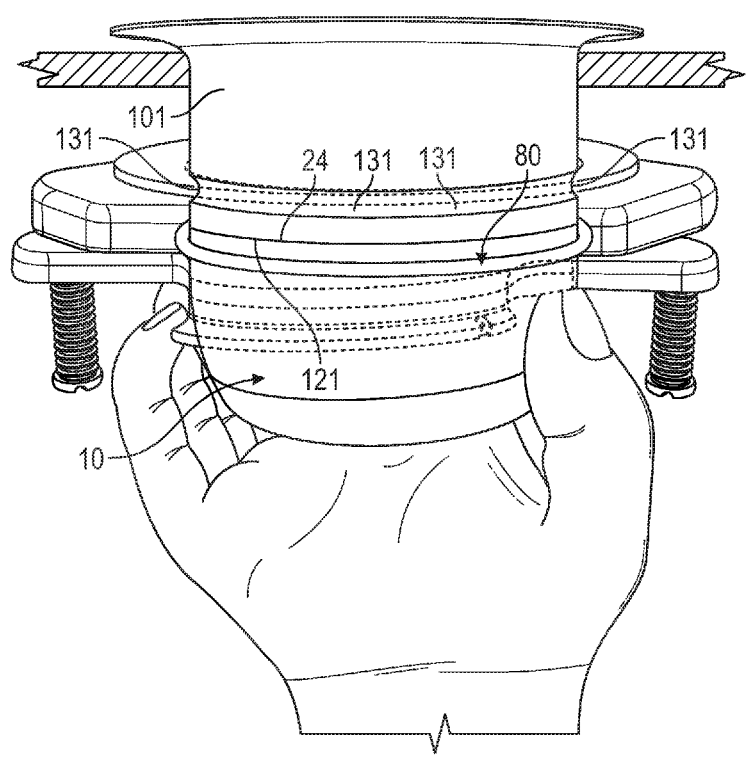
FIG. 8A is the same view as FIG. 8, except that portions of the fiber gasket, backup flange, and mounting ring have been placed in dashed lines, to reveal the top end of the tool mating with the bottom end of the tailpiece, and the snap-ring near the tool top end.

FIGS. 8 and 8A illustrate the combination of the tool with ring 80 and the stacked components 102 with 103, 104, and 105 raised to the point where the contoured top end surface 26 contacts and receives/mates-with the bottom end 111 of the tailpiece 101. Portions of the stack of components, still supported by the outermost wall/edge 24 of the top end 14, extends up along the outer cylindrical surface of the tailpiece 101, as the wall/edge 24 is now slightly above the bottom-most edge 121 of the tailpiece (FIG. 15A). FIG. 8 illustrates how the raised tool and stack would look in a side view, with the snap-ring 80 hidden from view below the stack. FIG. 8A reveals the fingers of the one hand supporting the tool, which supports the stack, the bottom end 111 of the flange mating with the top end 14 of the tool 10, and the snap-ring 80 having been pushed by the fingertips/thumb toward the top end of the tool but not yet up to the tailpiece 101. While a user's hand is not shown above the sink in FIGS. 8 and 8A, it will be understood that upward force from the hand holding the tool below the sink for example, especially upward force sufficient to push the snap-ring 80 toward the top end 14 of the tool, would typically would require the other user's hand to be above the sink to push down on the sink flange rim 141.

It may be noted that, in raising the tool from the position in FIG. 7 to position in FIGS. 8 and 8A that is concentric, coaxial and mated with the tailpiece 101, the user may want or need to slightly adjust, for example slide sideways back and forth, and/or rotate on its longitudinal axis LA, the tool 10 relative to the tailpiece 101. This adjustment may help in the proper concentric and coaxial alignment and may properly align the conventional components if they have shifted for some reason out of proper concentric and coaxial alignment with the tool 10 and the tailpiece 101.

Figure 9:
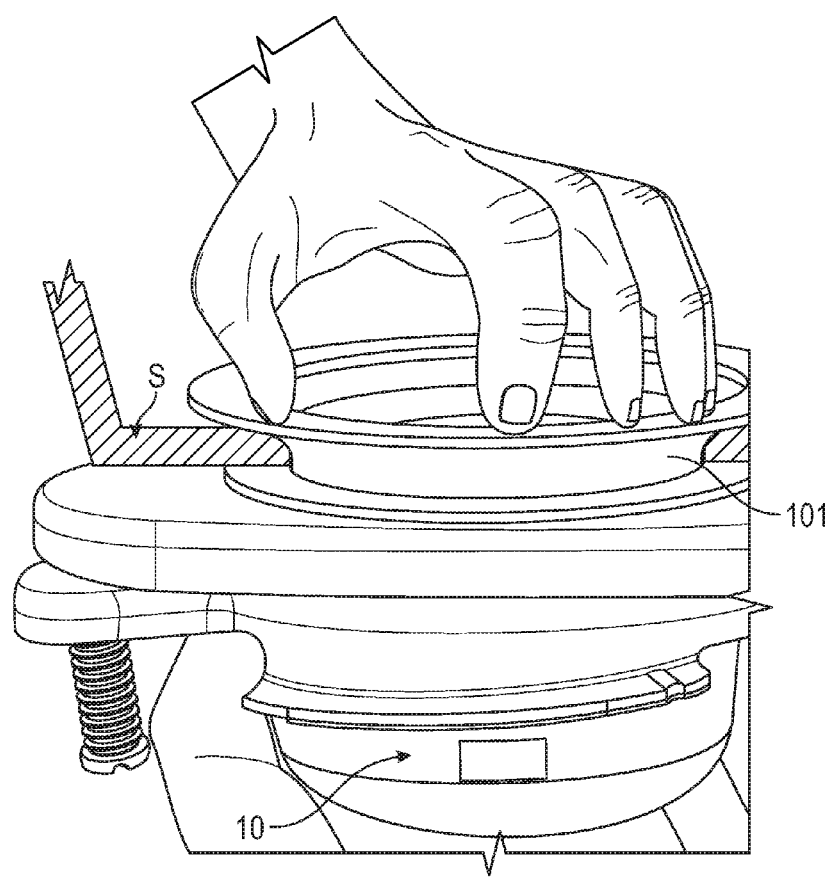
FIG. 9 is a side view showing that the user's one hand has pushed the snap-ring upward from the tool main portion, onto the outer cylindrical surface of the tailpiece, and into the tailpiece groove, wherein the user's finger(s) extend upward enough to hold the stack up close the bottom of the sink, and the user's other hand presses on the top lip of the sink flange to retain the sink flange in place in the sink.
Figure 9A:
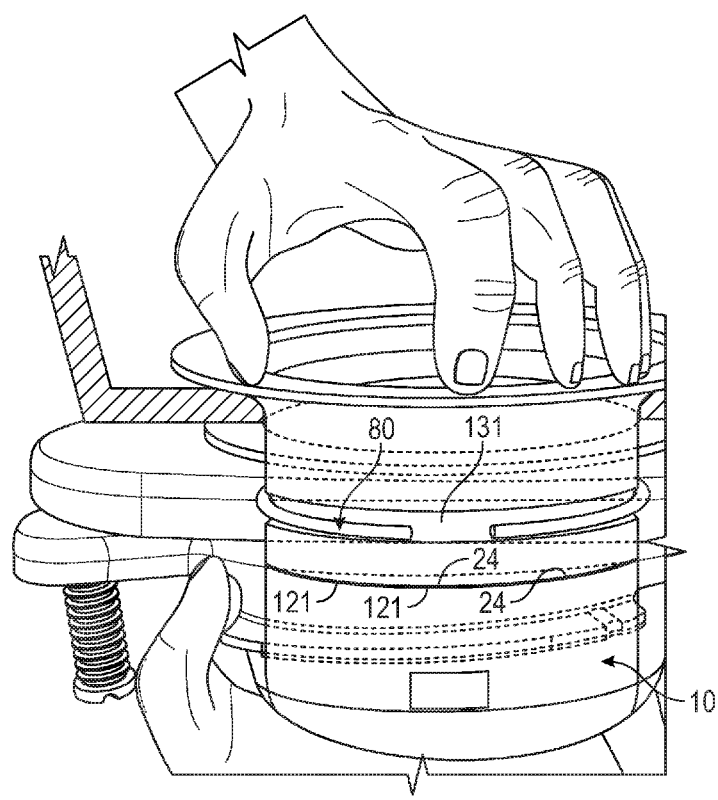
FIG. 9A is a view similar to FIG. 9, except that portions of the fiber gasket, backup flange, and mounting ring have been placed in dashed lines, to reveal the top end of the tool still mated with the bottom end of the sink flange tailpiece and the snap-ring in the sink flange groove.

FIGS. 9 and 9A illustrate that the user proceeds with the installation of the snap-ring 80 on the sink-flange 101, by sliding his fingers/thumb upward on the tool to force the snap-ring upward until it slides up off the tool and onto the tailpiece 101 and into the tailpiece circumferential groove 131. This is possible with one hand, and without the tool being fixed or secured to the tailpiece or any portion of the sink flange, because the user's fingers/thumb maintain an upward force on the tool that keeps the tool mated with the tailpiece 101 while the fingers also slide the snap-ring 80 upward to the groove 131. Note that, during this upward pushing of the snap-ring 80, the snap-ring 80, and/or fingertips protruding above the ring 80, may temporarily push the stacked components 102, 104, and 105 upward to at or near the bottom surface of the sink.

Due to said upward force of pushing the snap-ring 80 up into the groove, the user will typically push down on the rim 141 of the sink flange from above the sink, to prevent the upward force from dislodging the sink flange from its preferred location in the sink drain hole. This emphasizes an important reason that the tool 10 if so beneficial. A plumber or other user typically needs to press down on the sink flange rim 141 from above at the same time as manipulating the snap-ring from below the sink, and this is very difficult and/or uncomfortable to do. On the contrary, the tool 10 allows pre-expansion of the ring 80, with two hands, well before the plumber/user needs to reach below the sink. Also, the tool 10 allows easy stacking of the conventional components 102 with 103, 104, and 105 on top of the tool to form a single unit that is raised to the tailpiece. And, the installation of the already-expanded snap-ring 80 onto the tailpiece is done with little manipulation of the ring 80 or the stack of conventional components, with simple and smooth movement(s) by one hand underneath the sink. The simple movement(s) may be substantially or entirely a single vertical movement by the one hand, bringing the single unit comprised of tool 10 with ring 80 and the stacked components, up to the tailpiece and then continuing the vertical movement of the hand to push the ring 80 upward to snap into the groove. This smooth movement may be done very quickly and efficiently.

Figure 10:
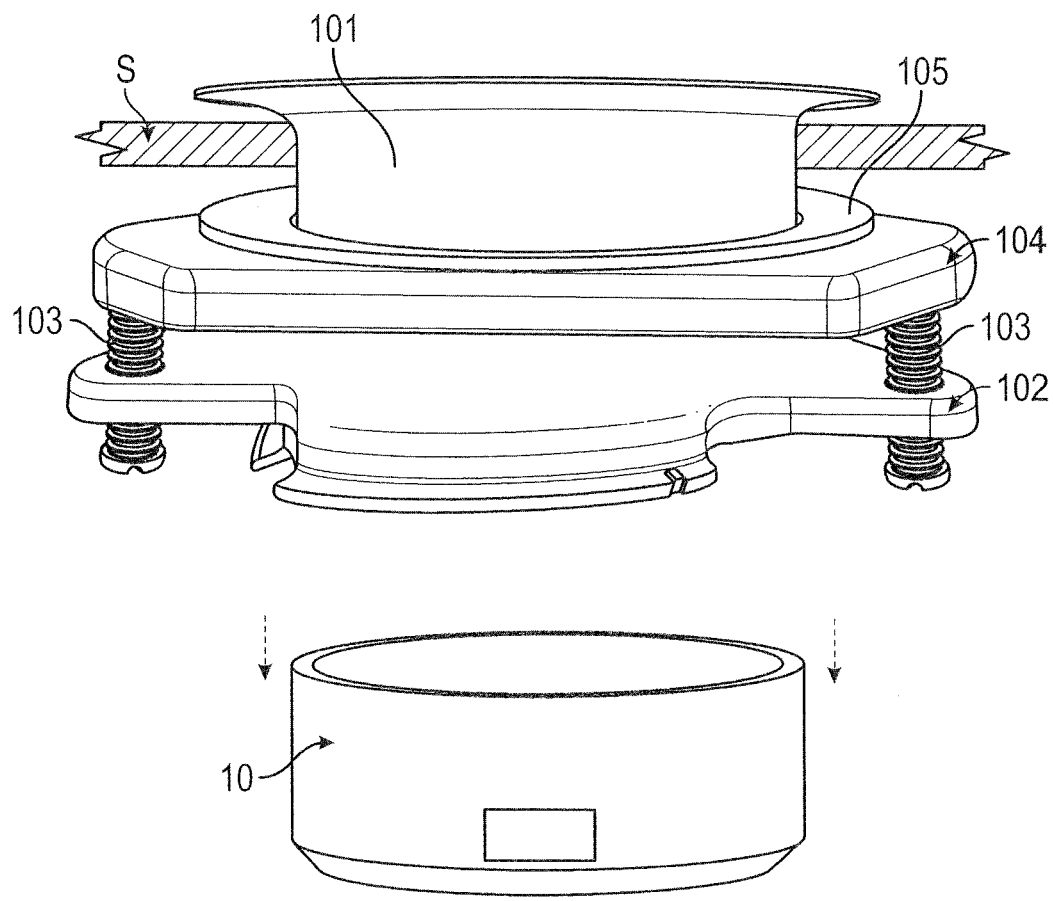
FIG. 10 is a side view of the conventional garbage disposal components of FIGS. 7-9 hanging on the sink flange tailpiece supported by the snap-ring, with the screws partially extended to raise the backup flange, and the fiber gasket toward, toward the bottom of the sink, and wherein the tool is being lowered/dropped away from the snap-ring and conventional components. The snap-ring is hidden under said components in this view.

Once the snap-ring 80 has snapped into the groove, as shown to best advantage in FIG. 9A, the job of the tool is accomplished. The tool 10 and the user's hand may be lowered and/or dropped away, and the stacked components 102, 103 with 104, and 105 will slide down until the stack (specifically the mounting rung 102) rests on the ring 80 so that the entire stack is held on the sink flange tailpiece in the normal position that results from conventional snap-ring 80 installation. Then, the process of rotating the screws relative to the mounting rung 102, to extend the screws upward to push the backup ring 104 up away from the mounting ring 102, is started. FIG. 10 illustrates the screws 103 part way through this process. Subsequent steps in installation of the disposal are conventional and will be understood by those of skill in the art.

Figure 11:
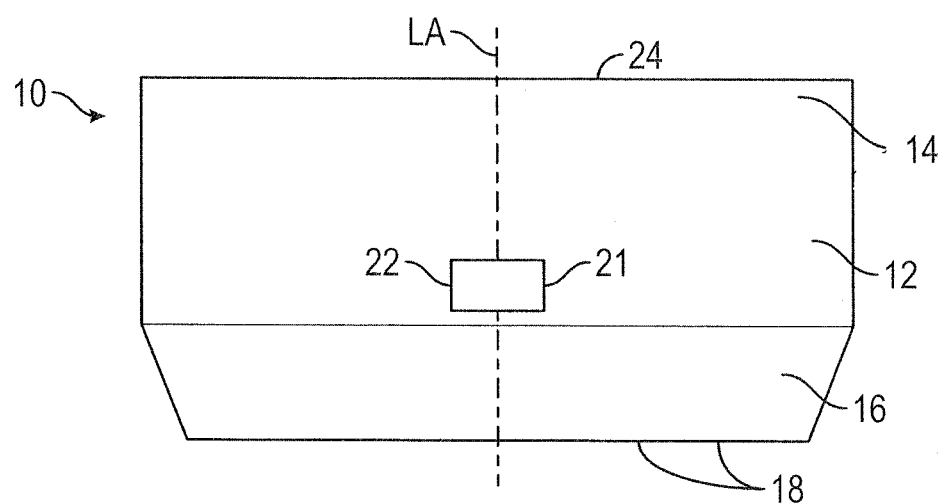
FIG. 11 is a front side view of the tool of FIGS. 1-10, in the in-use orientation.
Figure 12:
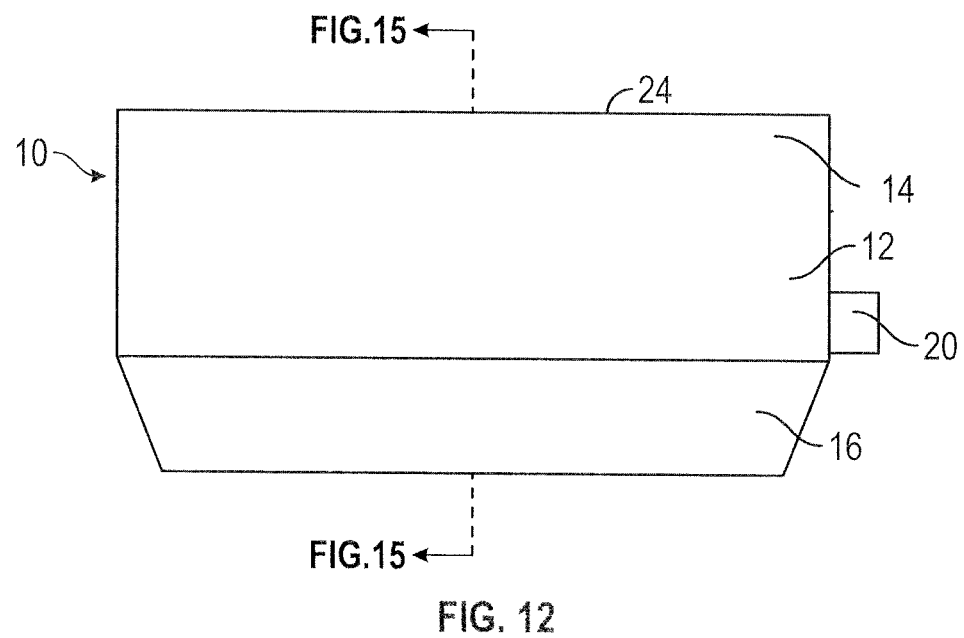
FIG. 12 is a left side view of the tool of FIGS. 1-11, in the in-use orientation.

FIGS. 11 and 12 are front side, and left side, views of tool 10. FIG. 11 shows the central longitudinal axis LA in dashed lines. The axis LA is indicative and parallel to the length of the tool 10.

Tool 10 is preferably sized for use with a conventional tailpiece 101 such as those commonly provided with an INSINKERATOR™ brand, or similar, garbage disposal. For example, the tool 10 may be made from a tubular material having a 3 inch I.D., and a 3.5 inch O.D. (or 0.25 inch thick wall), and be about 1.5 inches long. For example, tab 20 may be about ⅜-½ inch in circumferential length, about 3/16-½ inch (preferably about ¼ inch) in the dimension parallel to the longitudinal axis LA of the tool, and protruding radially about ¼-½ inch (preferably about ¼ inch) from the outer cylindrical surface of the main portion of the tool. For example, shapes other than rectangular may be used for tab 20, but the rectangular shape drawn is an efficient way to provide axially-extending ends 21, 22 for holding/gripping ring ends 81, 82. The contoured top surface 26, 36, 46 is preferably about ⅛-¼ inch (preferably about 3/16 inch) deep at its deepest point.

Figure 13:
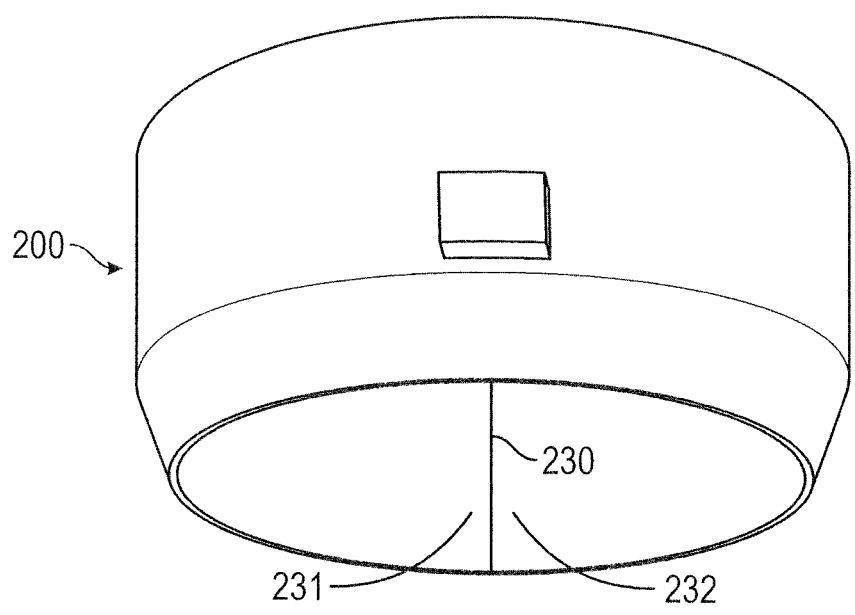
FIG. 13 is a bottom perspective view of another tool embodiment that is vertically slit through the entire tool wall at one location at the rear side of the tool, wherein the tool is in the in-use orientation.
Figure 14:
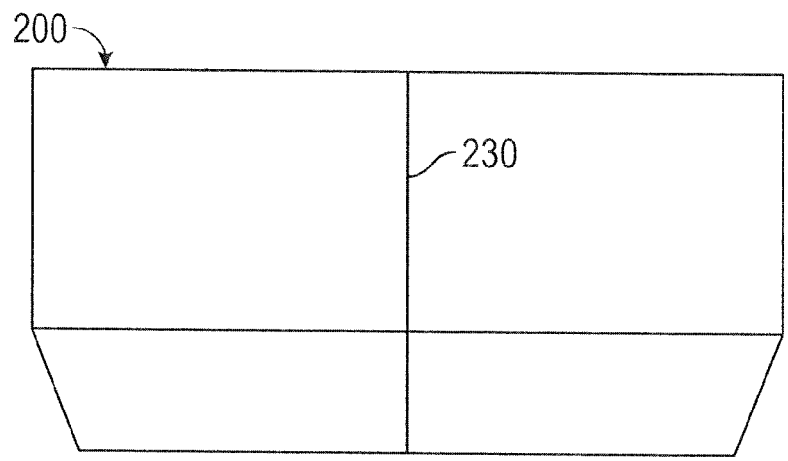
FIG. 14 is a rear side view of the tool of FIG. 13.

FIGS. 13 and 14 are bottom perspective, and rear side, views of another embodiment of tool 200. Tool 200 is the same, or substantially the same, as tool 10, as will be understood by one viewing the figures, except that the wall of the tool 200 comprises a longitudinal slit 230 all the way through the wall from the outside to the inside and from top to bottom. Thus, this tool 200 has wall ends 231, 232 that can be separated by spreading the tool wall, for example, if the user 200 needs to be opened enough to extend around another object or tool.

Figure 15:
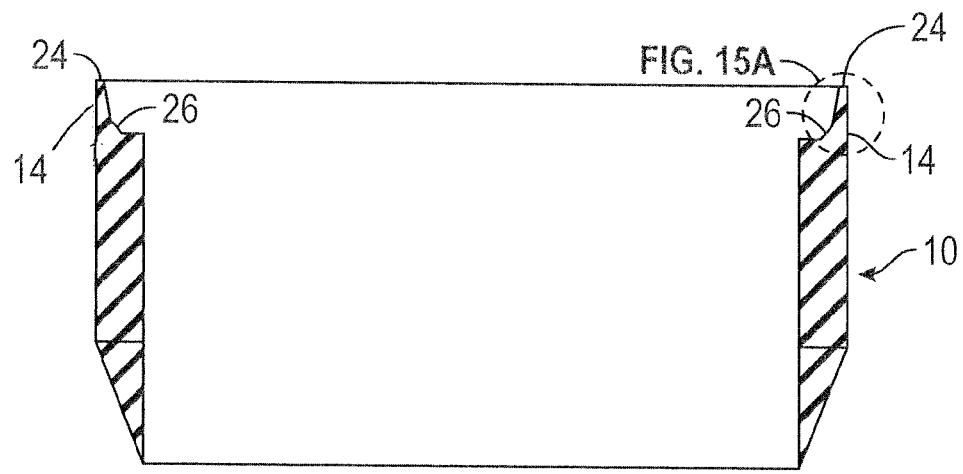
FIG. 15 is a cross-section of the tool of FIGS. 1-12, viewed along the line 15-15 in FIG. 12, illustrating one curved contour of the top end surface.
Figure 15A:
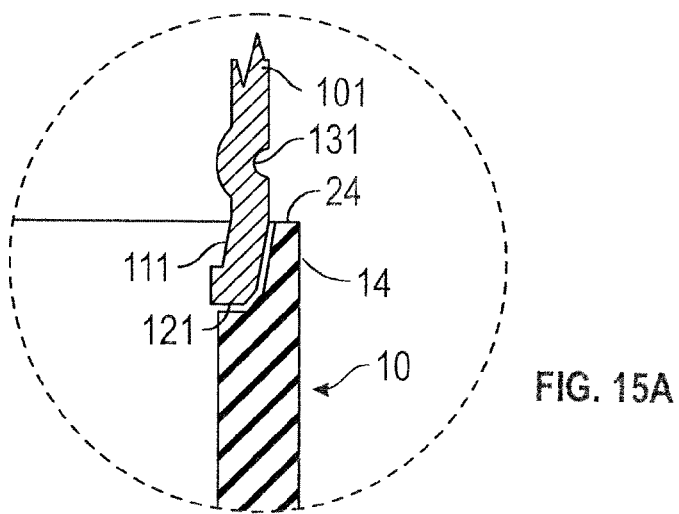
FIG. 15A is a cross-sectional detail enlarging the circled portion of FIG. 15 and adding the lower end of the tailpiece mating with the contoured top surface of the tool.
Figure 16:
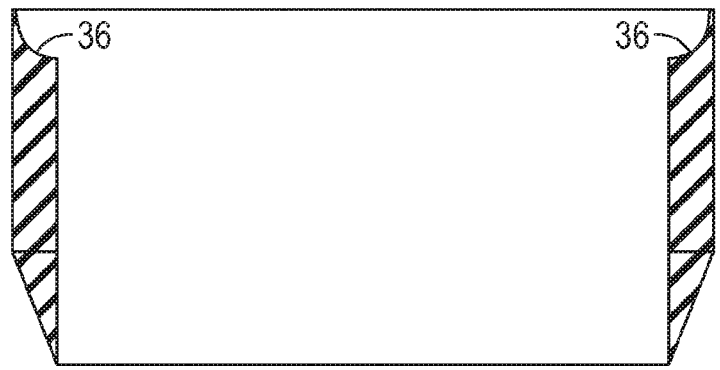
FIG. 16 shows a cross-sectional view of the tool of FIGS. 1-12, showing an alternative curved contour of the top end surface.
Figure 17:
FIG. 17 shows a cross-sectional view of the tool of FIGS. 1-12, showing another alternative top end surface contour that is a double-walled recess.

FIGS. 15-17 illustrate three embodiments of the top end 14 of tool, and which may be applied to the top ends of other tool embodiments such as tool 200, and tool 300 discussed later in this document. FIG. 15 shows the preferred contour of the top end 14, which comprises outermost wall/edge 24, and a downwardly curved contoured surface 26 extending inward from the wall/edge 24. This surface 26, near the well/edge 24, extends down at about 5-10 degrees to vertical, and extends, at its innermost portion horizontally, with a transition middle portion that is at about 45 degrees. As shown in FIG. 15A, the bottom end 111 of the tailpiece, including the bottommost edge 121 of the tailpiece, are received against and/or near the surface 26, to mate with said surface 26.

Alternatively, other curvature may be used in certain embodiments, for example, for alternatively shaped tailpiece bottom ends. FIG. 16 shows a surface 36 that is more consistently curved, for example, on a single radius. In the embodiments of FIGS. 15 and 16, one may see that the low inside edge of the contoured surface 26, 36 may allow the bottom end of the tailpiece, when mated with the surface 26, 36, to extend past the low inside edge and into the central hollow space of the tool. On the other hand, however, FIG. 17 shows a contoured top surface 46 that has a bottom wall 47, and two side walls 48, forming a "walled" recess in the top end of the tool. Such a tool may need to have a thicker wall to accommodate the bottom end of a tailpiece depending on the shape of that bottom end, for example, as the bottom end will typically need to fit between the sidewalls 48 in order to mate with the surface 46.

Figure 18:
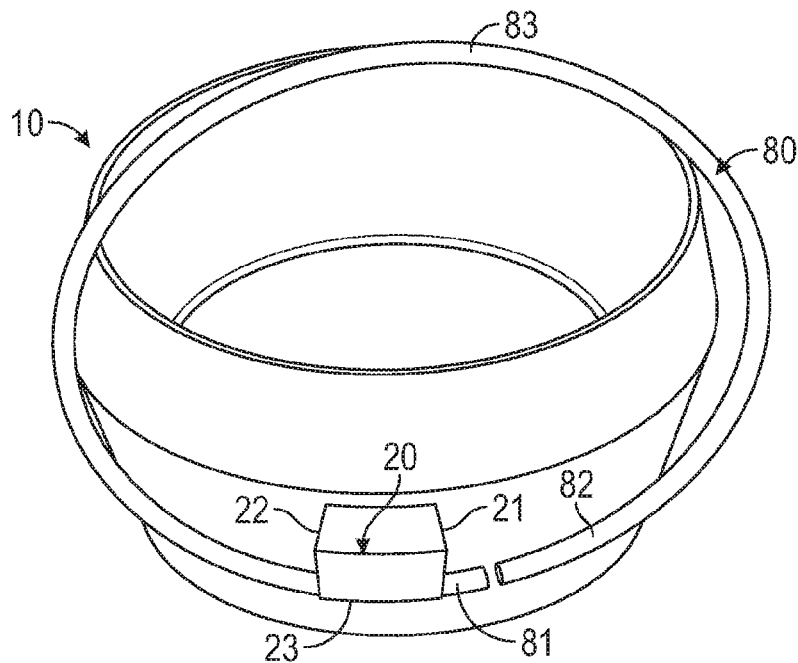
FIG. 18 shows an alternative first step in the method of installing the snap-ring on the tool of FIGS. 1-12.

FIG. 18 portrays an alternative use of tool 10 in the ring-mounting steps of the method. The user may choose to place only one end 81 of the snap-ring 80 against the tab 20, specifically against a circumferential surface 23, to place the end 81 "below" the tab when the tool is in this ring-mounting orientation. This way, the ring 80 may be pushed down onto the main portion of the tool, generally as illustrated by FIG. 4, with the one end 81 preventing the ring from flying/snapping off of the tool in the direction of the user (generally upward in FIG. 4). Thus, this is another way that a radial protrusion, such as tab 20, is adapted and used to temporarily retain, control, and/or stabilize at least one end of the snap-ring 80, but this method of using the tab 20 does not include the tab 20 spreading apart the two ends of the ring to expand the ring.

Figure 19:
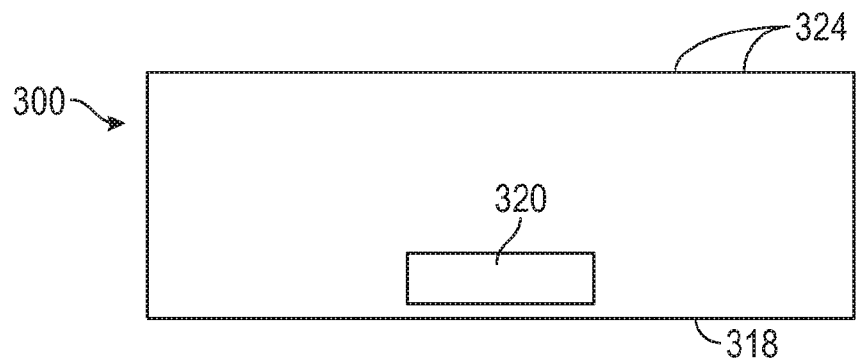
FIG. 19 is a front side view of another tool embodiment with a generally cylindrical main portion with no tapered end, and a longer expander tab.
Figure 20:
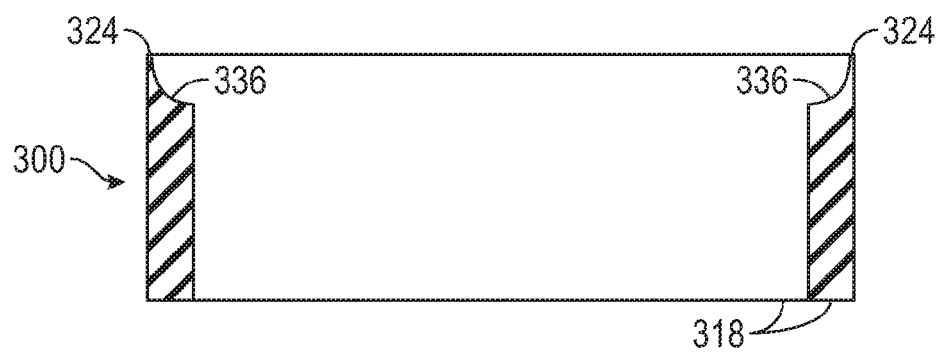
FIG. 20 is a cross-section of the tool of FIG. 19, showing one embodiment of a curved contour of the top end surface.

FIGS. 19-24 illustrate an alternative embodiment of the invented tool that, like tool 10, includes a radial protrusion for spreading the two ends of the ring for expanding the ring. FIGS. 19 and 20 show the tool 300 in in-use orientation, with its contoured top end surface 336 pointing toward the top of the page. Said contoured top surface 336 is shown to be the same as contoured top surface 36 in FIG. 16, but other contours, including curved or recessed surfaces may be used in certain embodiments, for example, contours such as surface 26 of FIG. 15, or surface 46 of FIG. 17. It may be noted that, like tool 10, tool 300 has an outermost wall/edge 324, and a tool outer diameter at wall/edge 324 and preferably all along the length of the tool, that is sized and used as discuss above for tool 10. Tool 300 is a hollow, generally cylindrical form, with a single tab 320 near the bottommost edge 318, but preferably without any taper or diameter reduction that may be likened to tapered bottom end 16 of tool 10. Instead, the circumferential length of tab 320 is greater than that of tab 20, so that it received ends 81, 82 much like described above for tab 20, but the greater length spreads apart those ends 81, 82 a greater distance to cause greater expansion of the ring 80.

Figure 21:
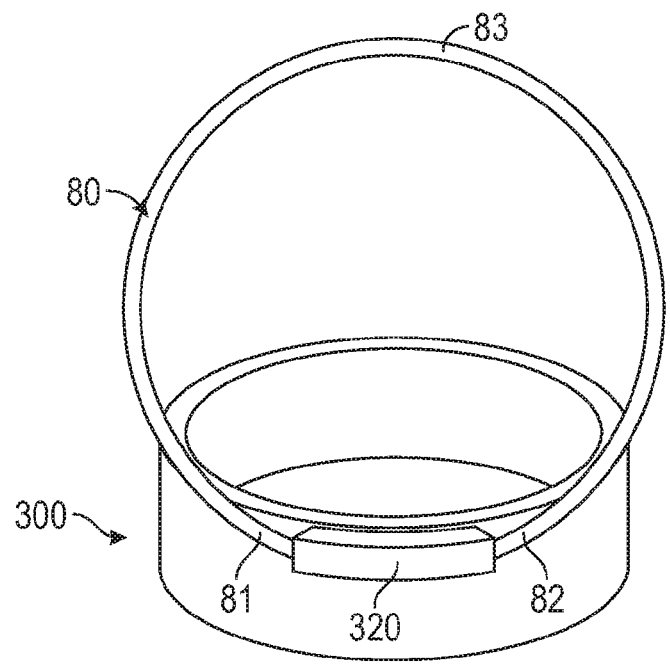
FIG. 21 is a perspective view of the tool of FIGS. 19 and 20, in ring-mounting orientation, wherein a snap-ring is expanded by the longer expander tab, but not yet pivoted around the main portion of the tool.
Figure 22:
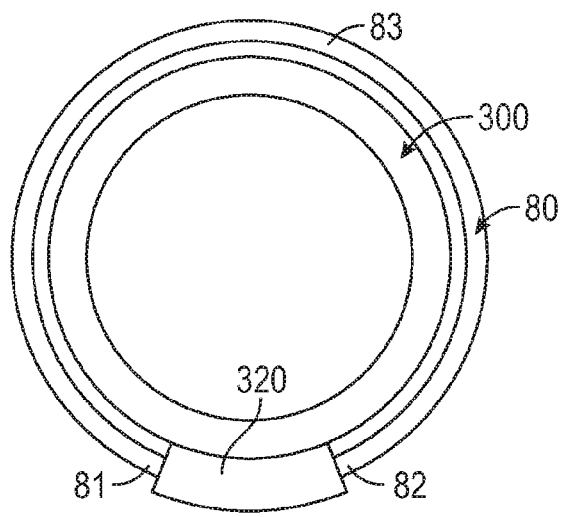
FIG. 22 is a bottom end view of the tool and snap-ring combination of FIG. 21 that shows the snap-ring pivoted to be around the outer cylindrical surface of the tool.
Figure 23:
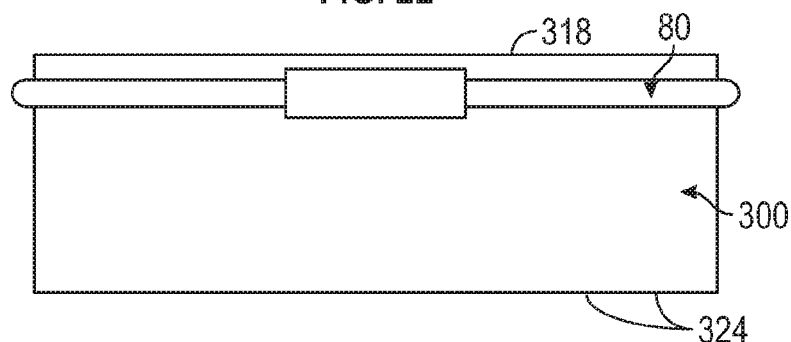
FIG. 23 is a front side view of the tool of FIGS. 21 and 22, in the ring-mounting orientation, with the snap-ring installed as in FIG. 22.
Figure 24:
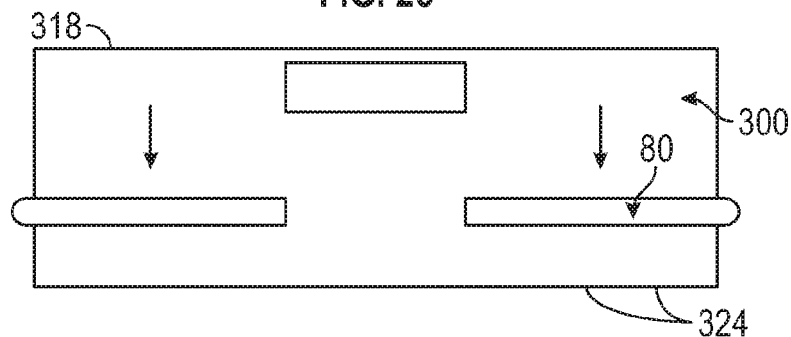
FIG. 24 is a front side view of the tool of FIGS. 21-23, still in the ring-mounting orientation, but with the expanded snap-ring pushed away from the expander tab, along the outer cylindrical surface of the tool, in preparation for rotating the tool 180 degrees to the in-use orientation for use similarly as in the method shown in FIGS. 7-10.
Figure 25:
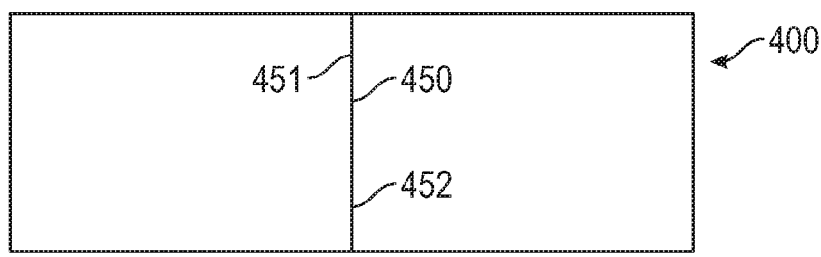
FIG. 25 is a rear side view of another embodiment of the invented tool.

Therefore, a tapered end is not needed in tool 300, and the ring is mounted as shown in FIGS. 21-24, in which figures the tool 300 is flipped 180 degrees from FIGS. 19 and 20 to be in ring-mounting orientation. One may see that FIG. 21 shows a step generally analogous to that in FIG. 1, but with the ring expanded to a larger diameter, and that FIGS. 22 and 23 show the ring 80 is pivoted around the tool 300 without it sliding along, and being expanded by, a tapered surface. This is because the circumferentially-longer tab 320 has already expanded the ring 80 to have an inner diameter nearly the same, or preferably slightly larger than, the outer diameter of the tool 300. Thus, in FIG. 24, the ring 80 may be slid away from the tab 320 into a position much like that on tool 10 in FIGS. 5 and 6, in preparation for rotating the tool 180 degrees into the in-use orientation and then using the tool the same or much like tool 10 in FIGS. 7-10. The above discussion regarding tool 10 and its diameter and structure relative to the tailpiece and the conventional disposal components 102, 103, 104, and 105, and its use in combination with a ring and a sink flange/tailpiece, is incorporated herein by this reference, as will be understood by one of skill in the art after viewing the figures, with the exception that a tapered end need not be included in tool 300 or used in mounting a ring to tool 300.

Tool 300 is preferably sized for use with a conventional tailpiece 101 such as those commonly provided with an INSINKERATOR™ brand, or similar, garbage disposal. For example, the tool 300 may be made from a tubular material having a 3 inch I.D., and a 3.5 inch O.D. (or 0.25 inch thick wall), and be about 1 inch long, wherein the shorter length assists in compact packaging and is possible because there is no tapered bottom end included. For example, circumferentially longer tab 320 may be about ⅞ inch to 1.25 inch (preferably about 1 inch) in circumferential length, about 3/16-½ inch (preferably about ¼ inch) in the dimension parallel to the longitudinal axis LA of the tool, and protruding radially about ¼-½ inch (preferably about ¼ inch) from the outer cylindrical surface of the main portion of the tool. As in tool 10, shapes other than rectangular may be used for tab 320, but the rectangular shape drawn is an efficient way to provide axially-extending ends of the tab 320 for holding/gripping ring ends 81. 82. The contoured top surface 336 or other contour shapes is/are preferably about ⅛-¼ inch (preferably about 3/16 inch) deep at the deepest point.

Figure 26:
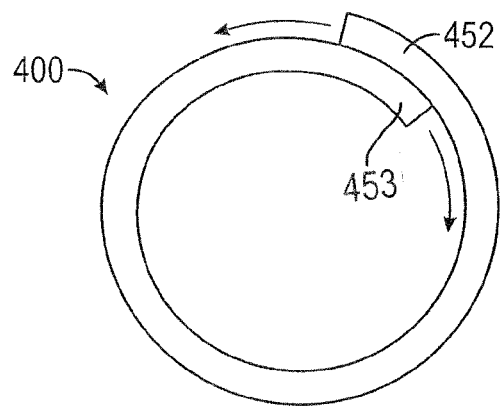
FIG. 26 is a top view of the tool of FIG. 25 being reduced in diameter by overlapping the ends of the slit tool wall.
Figure 27:
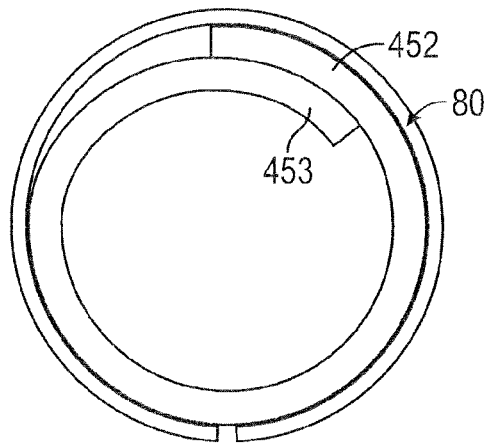
FIG. 27 is a top view of the reduced-diameter tool of FIG. 26 inserted into the center of a relaxed snap-ring.

FIGS. 25-32 portray additional embodiment(s) of a tool and methods. Tool 400 is a hollow, cylindrical, wall, with a vertical slit 450 all the way through the wall at one location in the wall curving. The resulting to ends 452, 453 are typically biased together by resilience of the wall. The wall, however, is flexible enough that the wall can be "rolled-up", to overlap the ends 452, 453 as shown in FIG. 26, with relative movement of the ends 452, 453 indicated by the arrows. Thus, the outer diameter of the tool 400 is effectively reduced in FIG. 26, and may be inserted in to the central space of an unexpanded, relaxed ring 80, as in FIG. 27. The user may then pull/expand the tool 400 back to its normal, larger diameter, shape and configuration, as in FIG. 28. This action, in going from FIG. 27 to FIG. 28, applies force to the inner surface of the ring 80 to expand the ring into a larger diameter that distances its two ends 81, 82. This tool, therefore, expands the ring "from within" the ring, rather than using an expander tab 20, 320 and/or a tapered tool end 16. With such a tool, the pressure of the tool 400 against the inner surface of the ring 80 serves to temporarily retain, control, and/or stabilize the ring around the tool 400, and this is done without a radial protrusion such as a tab 20, 320. Such a tool 400 may be made of strong but somewhat flexible material, and it may be resilient to assist in the return to the larger-diameter configuration of FIG. 28.

Tool 400 may be a good option for providing a one-time-use disposable tool. For example, the tool 400 may flex enough to enter the reduced-diameter state in FIGS. 26 and 27, and may then resiliently and/or by force of the user return to the enlarged-diameter confirmation in FIG. 28. Depending on the material, however, this reduction and enlargement, may not be effectively repeated a multiple, or many, times. Therefore, a disposable tool such as this may be beneficially included in each garbage disposal package and disposed of after the installation of that disposal.

Figure 28:
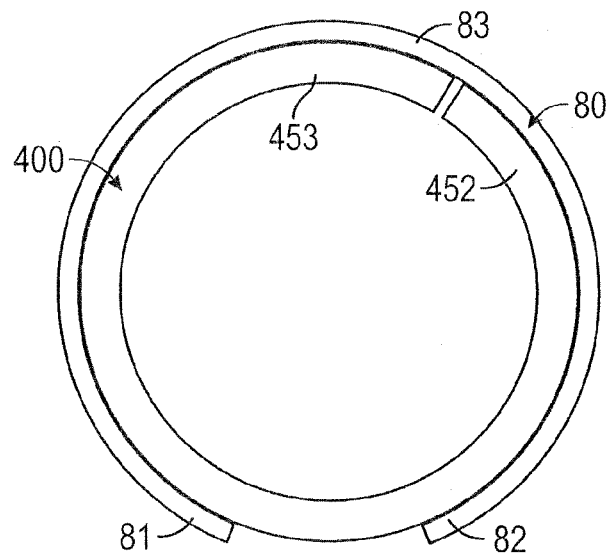
FIG. 28 is a top view of the tool of FIGS. 25-27, wherein the tool diameter has expanded the snap-ring, by reversing the overlapping of the ends to enlarge the diameter of the tool back to its diameter of FIG. 25.
Figure 29:
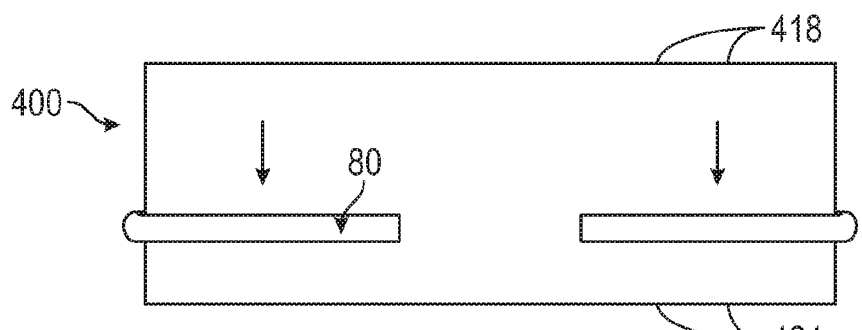
FIG. 29 is a front view of the tool of FIGS. 25 and 28, in its enlarged diameter configuration, wherein the snap-ring is being pushed toward the top end of the tool, in preparation for use similarly as in the method shown in FIGS. 7-10.

After the ring is mounted as in FIG. 28, the mounted ring 80 may be slid away from the bottommost edge 418 toward outermost wall/edge 424 of the contoured top end of the tool, as shown in FIG. 29. Then, the tool 400 is rotated the tool 180 degrees into the in-use orientation and then used the same or much like tool 10 in FIGS. 7-10. The above discussion regarding tool 10 and its diameter and structure relative to the tailpiece and the conventional disposal components 102, 103, 104, and 105, and its use in combination with a ring and a sink flange/tailpiece, is incorporated herein by this reference, as will be understood by one of skill in the art after viewing the figures, with the exception that a tapered end and a expander tab need not be included in tool 400 or used in mounting a ring to tool 400.

Figure 5:
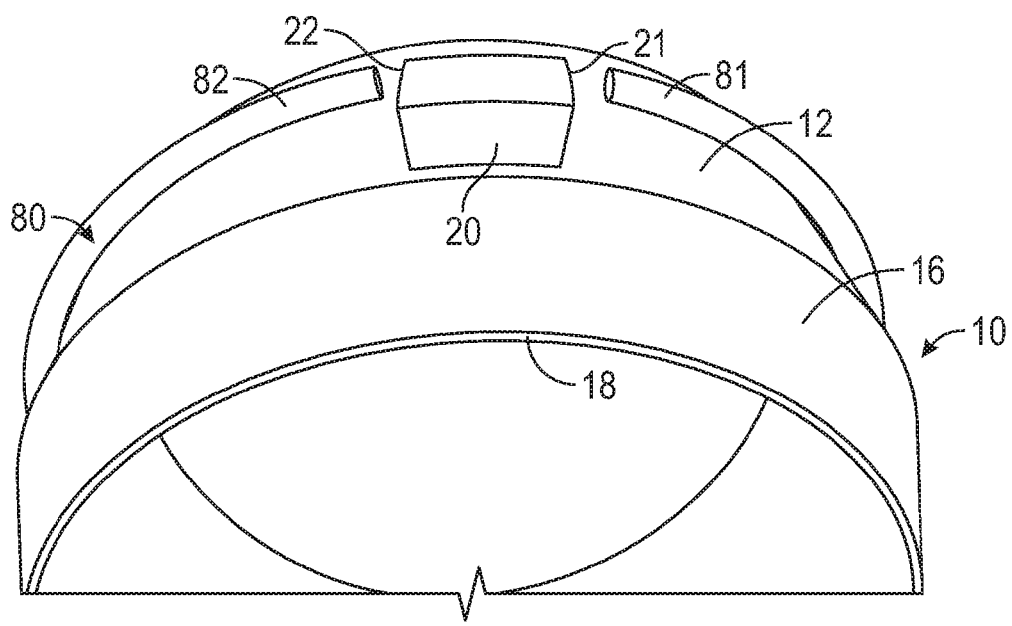
FIG. 5 is a partial bottom perspective view of the tool and snap-ring of FIGS. 1-4, which are in the in-use orientation (flipped 180 degrees from the ring-mounting orientation), wherein the snap-ring has been forced entirely onto the main portion of the tool, further expanding the snap-ring to move the ring ends off the expander tab, and the snap-ring has been forced further toward the top end of the tool.
Figure 6:
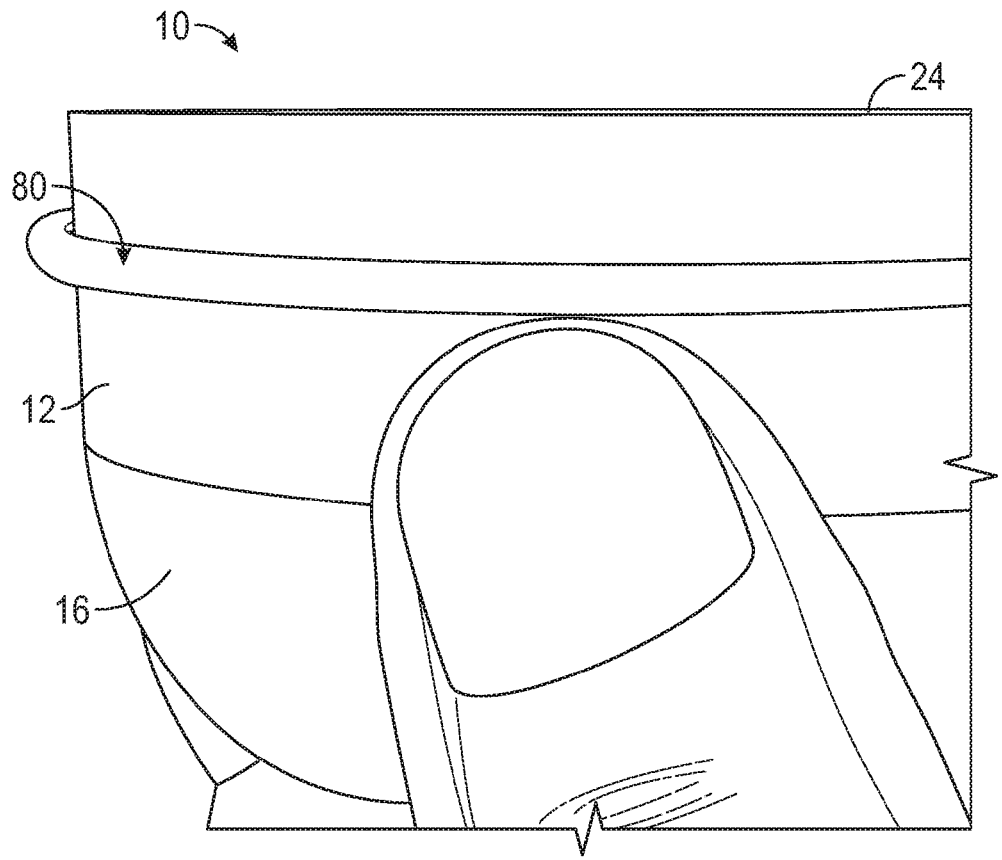
FIG. 6 is a partial side view of the tool and snap-ring of FIG. 5 in the in-use orientation, showing that the snap-ring is now nearer the top end than the bottom end of the tool.
Figure 30:
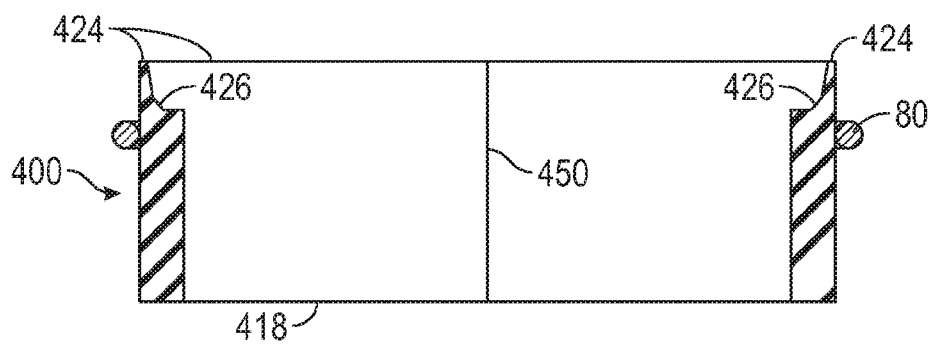
FIG. 30 is a cross-section of the tool of FIGS. 25 and 28, in its enlarged diameter configuration holding the expanded snap-ring, showing one curved contour of the top end surface.
Figure 31:
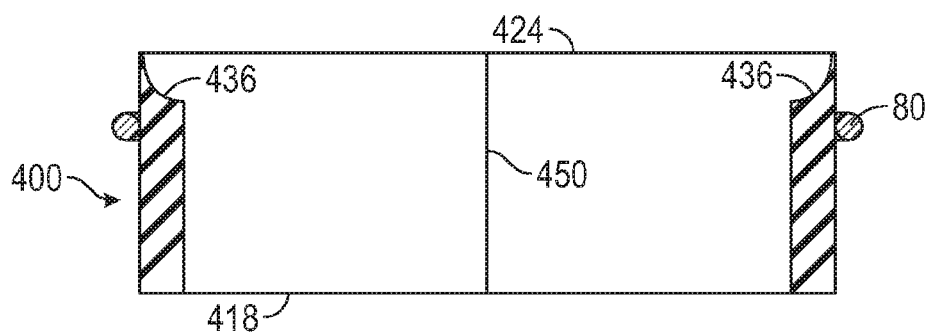
FIG. 31 is a cross-section of the tool of FIGS. 25 and 28, in its enlarged diameter configuration holding the expanded snap-ring, showing an alternative curved contour of the top end surface.
Figure 32:
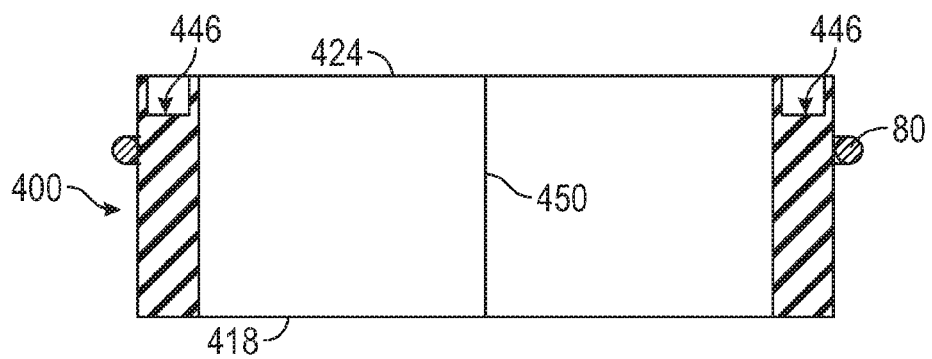
FIG. 32 is a cross-section of the tool of FIGS. 25 and 28, in its enlarged diameter configuration holding the expanded snap-ring, showing another alternative top end surface contour that is a double-walled recess.

FIG. 30-32 illustrate, in cross-section, three examples of possible contoured top surfaces 426, 436, 446, which correspond to surfaces 26, 36 (and 336), and 46, respectively. The ring 80 is shown in FIGS. 30-32 in cross-section, to emphasize that the ring is pushed in FIG. 19 toward outermost wall/edge 424 of the contoured top end of the tool as part of the process of installing the ring onto the tailpiece, for example, similarly as shown in FIGS. 4-6 for tool 10, and in FIG. 24 for tool 300.

Tool 400 is preferably sized for use with a conventional tailpiece 101 such as those commonly provided with an INSINKERATOR™ brand, or similar, garbage disposal. For example, the tool 400 may be made from a tubular material having a 3 inch I.D., and a 3.5 inch O.D. (or 0.25 inch thick wall), and be about ⅝-⅞ inch (preferably ¾ inch) long, wherein the shorter length assists in compact packaging and is possible because there is no tapered bottom end and no expander tab included. For example, the contoured top surface 426, 436, 446 or other contour shapes is/are preferably about ⅛-¼ inch (preferably about 3/16 inch) deep at the deepest point.

Although this invention has been described above with reference to particular means, materials and embodiments, it is to be understood that the invention is not limited to these disclosed particulars, but extends instead to all equivalents within the broad scope of this disclosure and drawings and to all equivalents within the scope of the following claims.

The invention claimed is:

1. A combination of a generally cylindrical snap-ring having two ends, a sink flange of an in-sink garbage disposal system having a tailpiece with a tailpiece outer diameter, and a tool for installing the snap-ring in a groove of the tailpiece, the tool comprising:
   a generally cylindrical main portion having a top end comprising a contoured upper surface adapted to mate with a bottom end of the tailpiece, an outer cylindrical surface with an outer diameter; and
   a protrusion extending radially outward from the outer cylindrical surface;
   wherein the snap-ring is mounted onto the tool by at least one end of the snap-ring being forced against a surface of the protrusion to retain the snap-ring on the tool while the snap-ring is moved to a mounted position wherein the snap-ring coaxially extends around the main portion;
   wherein, upon said mating of the contoured upper surface with the bottom end of the tailpiece, the snap-ring is slideable upward away from the protrusion, onto the tailpiece, and into the groove.

2. The combination of claim 1, wherein the tool mates with said bottom end of the tailpiece only by contacting the tailpiece, but is not fixed or attached to the tailpiece.

3. The combination of claim 1, where said at least one end of the snap-ring being forced against a surface of the protrusion comprises the two ends of the snap-ring being force against opposing ends of the protrusion, so that the snap-ring is pivotal relative to the protrusion to pivot to the mounted position.

4. The combination of claim 3, wherein the tool further comprises a tapered bottom end that is tapered to have a bottommost edge that is smaller in diameter than the outer diameter of the main portion, so that said pivoting of the snap-ring comprises the snap-ring being forced to slide along the tapered bottom end so that the snap-ring expands in diameter during said sliding.

5. The combination of claim 3, wherein the protrusion has a circumferential length that is 3/16-1.25 inches long to separate the ends of the snap-ring 3/16-1.25 inches to expand the snap-ring.

6. The combination of claim 5, wherein the protrusion extends radially ¼-½ inch from the outer cylindrical surface of the main portion.

7. The combination of claim 5, wherein the opposing ends of the protrusion are each flat and planar.

8. The combination of claim 1, wherein the outer diameter of the main portion is greater than the tailpiece outer diameter.

9. The combination of claim 8, wherein the outer diameter is ⅛ inch-¼ inch greater than the tailpiece outer diameter.

10. The combination of claim 1, wherein the contoured upper surface is curved from an outermost wall at the outer cylindrical surface of the main portion, to a lower inner edge at an inner surface of the tool.

11. The combination of claim 1, wherein the contoured upper surface comprises two sidewalls that are an outermost wall at the outer cylindrical surface of the main portion, and an inner wall at an inner surface of the tool, with a recess between said two sidewalls for receiving the bottom end of the tailpiece.

12. The combination of claim 1, wherein the tool consists only of said main portion and said protrusion.

13. The combination of claim 4, wherein the tool consists only of said main portion, said protrusion, and said tapered bottom end.

14. The combination of claim 4, wherein the protrusion is has a rectangular front surface parallel to the outer cylindrical surface of the main portion, and the two opposing ends of the protrusion are parallel to a central longitudinal axis of the tool.

15. The combination of claim 1, comprising no fastener that fastens the tool to the tailpiece.

16. The combination of claim 1, adapted so that only a user's fingers and/or thumb push the snap-ring from the tool to the tailpiece groove.

17. A combination of a generally cylindrical snap-ring having two ends and extending around an open center space, a sink flange of an in-sink garbage disposal system having a tailpiece with a tailpiece outer diameter, and a tool for installing the snap-ring in a groove of the tailpiece, the tool comprising:
   a generally cylindrical, hollow main portion formed by a curved wall an outer cylindrical surface, the main portion having a top end comprising a contoured upper surface adapted to mate with a bottom end of the tailpiece, and a slit through the curved wall to form two wall ends;

wherein the tool is flexible to an extent that is it movable into a reduced diameter configuration so that the tool is insertable into the center space of the snap-ring; and wherein the tool in the center space is expandable into an enlarged diameter configuration, with the snap-ring coaxially extending around the main portion, so that the snap-ring is forced to expand to an enlarged diameter that is larger than the tailpiece outer diameter;

wherein, upon said mating of the contoured upper surface with the bottom end of the tailpiece, the snap-ring is slideable upward onto the tailpiece and into the groove.

18. The combination of claim 17, wherein the tool consists only of said curved wall with two wall ends that is flexible to an extent that is moveable into the reduced diameter configuration and into the enlarged diameter configuration.

19. The combination of claim 17, wherein the two walls overlap each other in the reduced diameter configuration.

20. The combination of claim 17, wherein the two walls ends abut into each other in the enlarged diameter configuration.

* * * * *